(12) United States Patent
Murai

(10) Patent No.: US 6,469,470 B1
(45) Date of Patent: Oct. 22, 2002

(54) MOTOR DRIVE CIRCUIT HAVING A RESISTOR CIRCUIT FOR SINE WAVE GENERATION

(75) Inventor: Shigeki Murai, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/660,406

(22) Filed: Sep. 12, 2000

(30) Foreign Application Priority Data

Sep. 13, 1999 (JP) .......................................... 11-259599

(51) Int. Cl.[7] .............................................. H02P 5/28
(52) U.S. Cl. ...................................................... 318/811
(58) Field of Search ................................ 318/801, 802, 318/811, 807; 363/41, 97

(56) References Cited

U.S. PATENT DOCUMENTS 4,338,558 A * 7/1982 Okamatsu et al. ........... 318/802
4,574,340 A * 3/1986 Baker .......................... 363/41
5,650,708 A * 7/1997 Sawada et al. ............. 318/801

FOREIGN PATENT DOCUMENTS

JP 61-244106 10/1986
JP 2658085 6/1997

OTHER PUBLICATIONS

Howard V. Malmstadt et al., "Instrumentation For Scientists Series, Electronic Measurements For Scientists", W.A. Benjamin, Inc., Copyright 1974, 1973, pp. 643–645. no month.

* cited by examiner

*Primary Examiner*—Shawn Riley

(57) ABSTRACT

A motor drive circuit includes a voltage generator configured to form a basic wave for generating sine-wave currents, wherein the voltage generator includes a resistor circuit for generating a plurality of voltages, a timing circuit for sequentially selecting selected ones of the plurality of voltages generated by the resistor circuit, and a switch circuit, connected to the resistor circuit and under control of the timing circuit, for outputting the sequentially selected voltages as the basic wave. A triangular wave generator generates a triangular wave which is applied along with the basic wave generated by the voltage generator to a modulation circuit, and the modulation circuit generates a terminal voltage for generating a sine-wave current.

18 Claims, 5 Drawing Sheets

MOTOR DRIVE CIRCUIT HAVING A RESISTOR CIRCUIT FOR SINE WAVE GENERATION

CROSS REFERENCE TO RELATED APPLICATIONS

This application claims benefit of priority under 35 U.S.C. §119 based on Japanese patent application PH11-259599 filed Sep. 13, 1999, the entire contents of which are incorporated by reference herein.

BACKGROUND OF THE INVENTION

1. Field of the Invention

The present invention relates to drive circuits for driving motors, and particularly, to drive circuits employing sine-wave PWM for driving motors such as brushless motors and induction motors.

2. Description of the Related Art

FIG. 1 shows a drive circuit employing sine-wave PWM (pulse width modulation) for driving a motor, according to a prior art. The drive circuit 10 has a standard clock generator 1 for generating a standard clock signal. In synchronization with the standard clock signal, a timing circuit 2 specifies a ROM address, reads data from a ROM 3 according to the specified address, and transfers the read data to data latches 4. The ROM 3 stores data and corresponding addresses. The latches 4 temporarily store data read out of the ROM 3. DACs (digital analog converters) 5 are connected to the latches 4, respectively. A triangular wave generator 6 generates a triangular wave serving as a carrier signal for PWM. PWM generation comparators 7 are connected to the DACs 5, respectively. The latches 4, DACs 5, and comparators 7 are arranged for U-, V-, and W-phases, respectively.

Based on the standard's clock signal from the clock generator 1, the timing circuit 2 specifies a ROM address, reads data (voltage value) from the ROM 3 according to the specified ROM address, and transfers the read data to the latches 4 at the U-, V-, and W-phase timing. The DACs 5 receive the data from the latches 4 and convert the data into analog voltages to form basic waves used to generate sine-wave currents. The basic waves and a triangular wave from the triangular wave generator 6 are used by the comparators 7 to form, through PWM operations, sine-wave currents for driving a motor (not shown).

To prepare the basic waves for generating the sine-wave currents, the prior art of FIG. 1 must read data from the ROM 3 and convert the read data into voltages (the basic waves) through the DACs 5. This scheme increases the size of the drive circuit 10, and when the drive circuit 10 is integrated into a specific IC, raises the cost thereof.

To correctly generate the sine-wave currents, the drive circuit 10 must have precision, high-resolution DACs, which increase the size and cost of the drive circuit 10.

SUMMARY OF THE INVENTION

It is an object of the present invention to provide a drive circuit capable of generating correct sine-wave currents without increasing the size and cost thereof. To that end, there is provided a drive circuit including a voltage generator which has a resistor circuit for generating a plurality of voltages, a timing circuit which sequentially selects different ones of the voltages generated by the resistor circuit, and a switch circuit connected to the resistor circuit and the timing circuit for outputting the sequentially selected voltages. A triangular wave generator generates a triangular wave which serves as a PWM carrier signal, and the triangular wave is applied to a modulation circuit along with the selected voltage from the switch circuit to generate terminal voltages for generating sine-wave currents.

BRIEF DESCRIPTION OF THE DRAWINGS

The objects, features, and advantages of the present invention will become more apparent from the following description of the preferred embodiment taken in conjunction with the accompanying drawings, in which.

DESCRIPTION OF THE PREFERRED EMBODIMENTS

Figure 1:
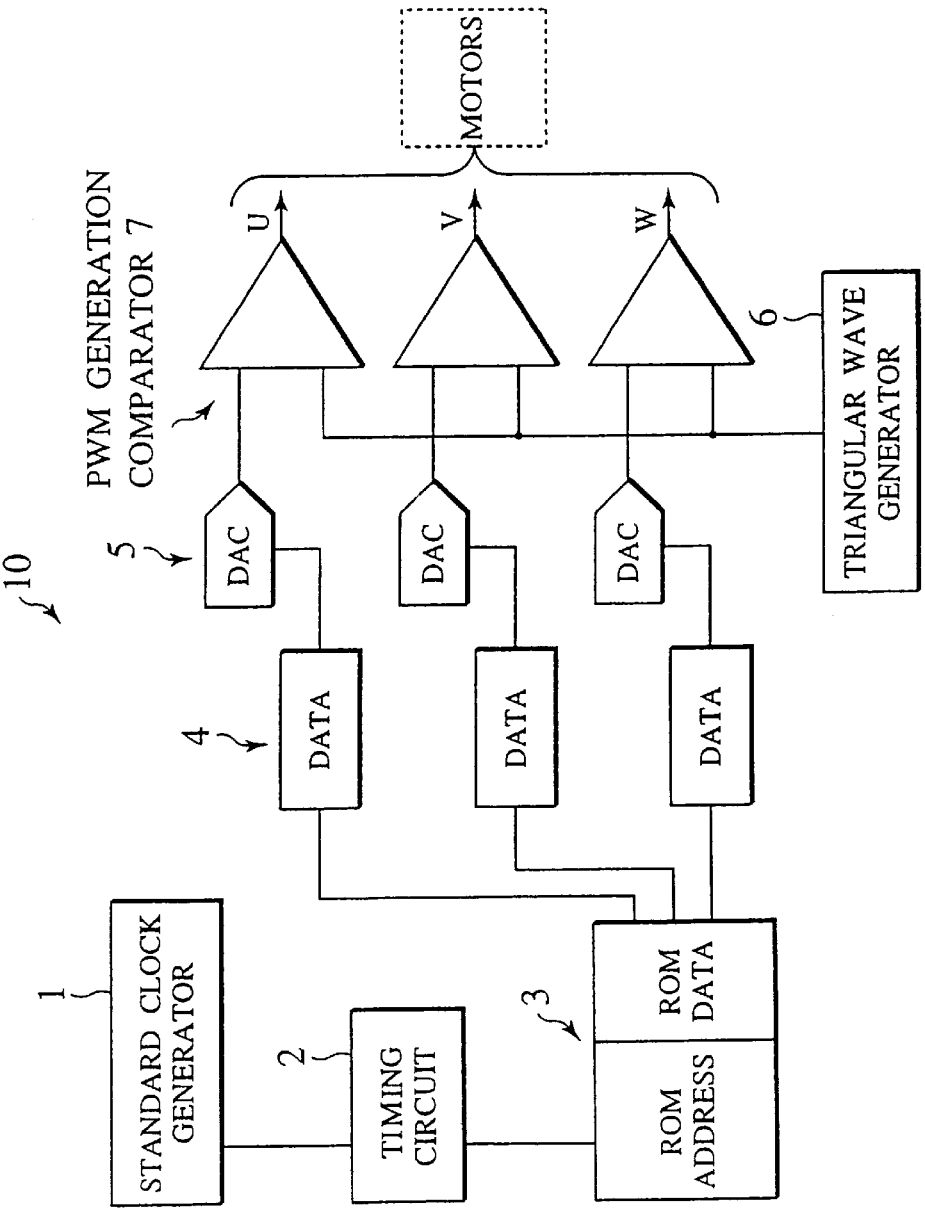
FIG. 1 shows a drive circuit employing sine-wave PWM for driving a motor according to a prior art.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Figure 2:
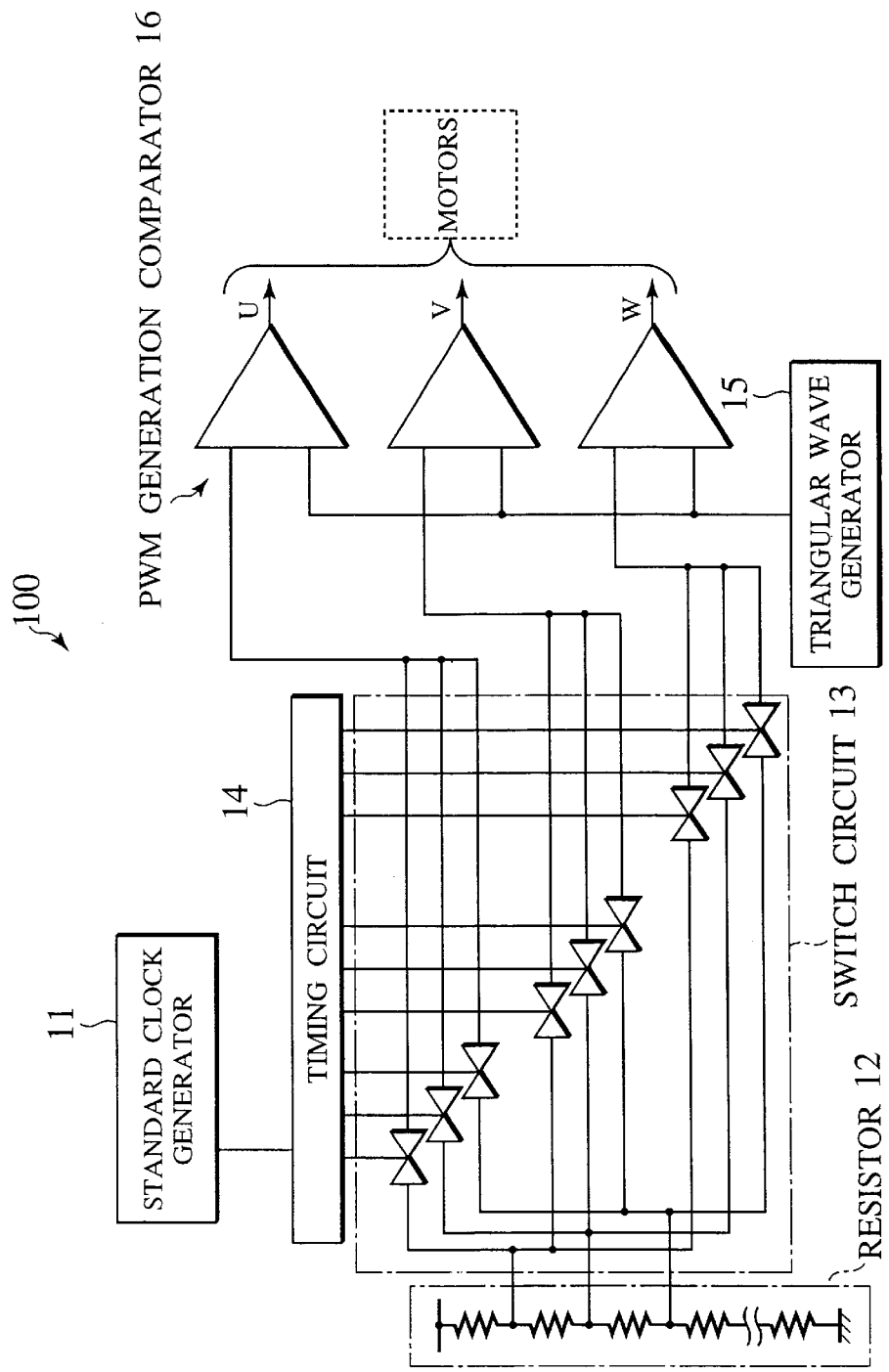
FIG. 2 shows a drive circuit employing sine-wave PWM for driving a motor according to the present invention.

FIG. 2 shows a drive circuit employing sine-wave PWM for driving a motor according to the present invention. The drive circuit 100 has a standard clock generator 11 for generating a standard clock signal, which is supplied to a timing circuit 14. A resistor circuit 12 generates basic wave voltages to be used to generate sine-wave currents. A switch circuit 13 is controlled by the timing circuit 14, to select proper ones among the basic wave voltages provided by the resistor circuit 12. A triangular wave generator 15 generates a triangular wave serving as a PWM carrier signal. According to the triangular wave, PWM generation comparators 16 carry out PWM operations.

The resistor circuit 12 has resistors connected in series to generate a plurality of voltages. Nodes among the resistors are connected to output lines, which are connected and disconnected by the switch circuit 13, to select proper ones from the voltages provided by the resistors. The resistance values of the resistors in the resistor circuit 12 are set to provide basic waves necessary for generating required sine-wave currents. Namely, the resistance values of the resistors are calculated in advance according to the target basic waves so that voltages at the nodes in the resistor circuit 12 may serve as source voltages to provide the basic waves.

The switch circuit 13 has switches to be closed and opened in response to signals from the timing circuit 14. These switches are separately connected to the output lines of the resistor circuit 12 and are allocated for U-, V-, and W-phases, so that the different voltages provided by the resistor circuit 12 may selectively be supplied to the U-, V-, and -W-phases.

In synchronization with the standard clock signal from the clock generator 11, the timing circuit 14 provides select signals to open and close the switches of the switch circuit 13, thereby selectively supplying the voltages from the resistor circuit 12 to the comparators 16.

Figure 3:
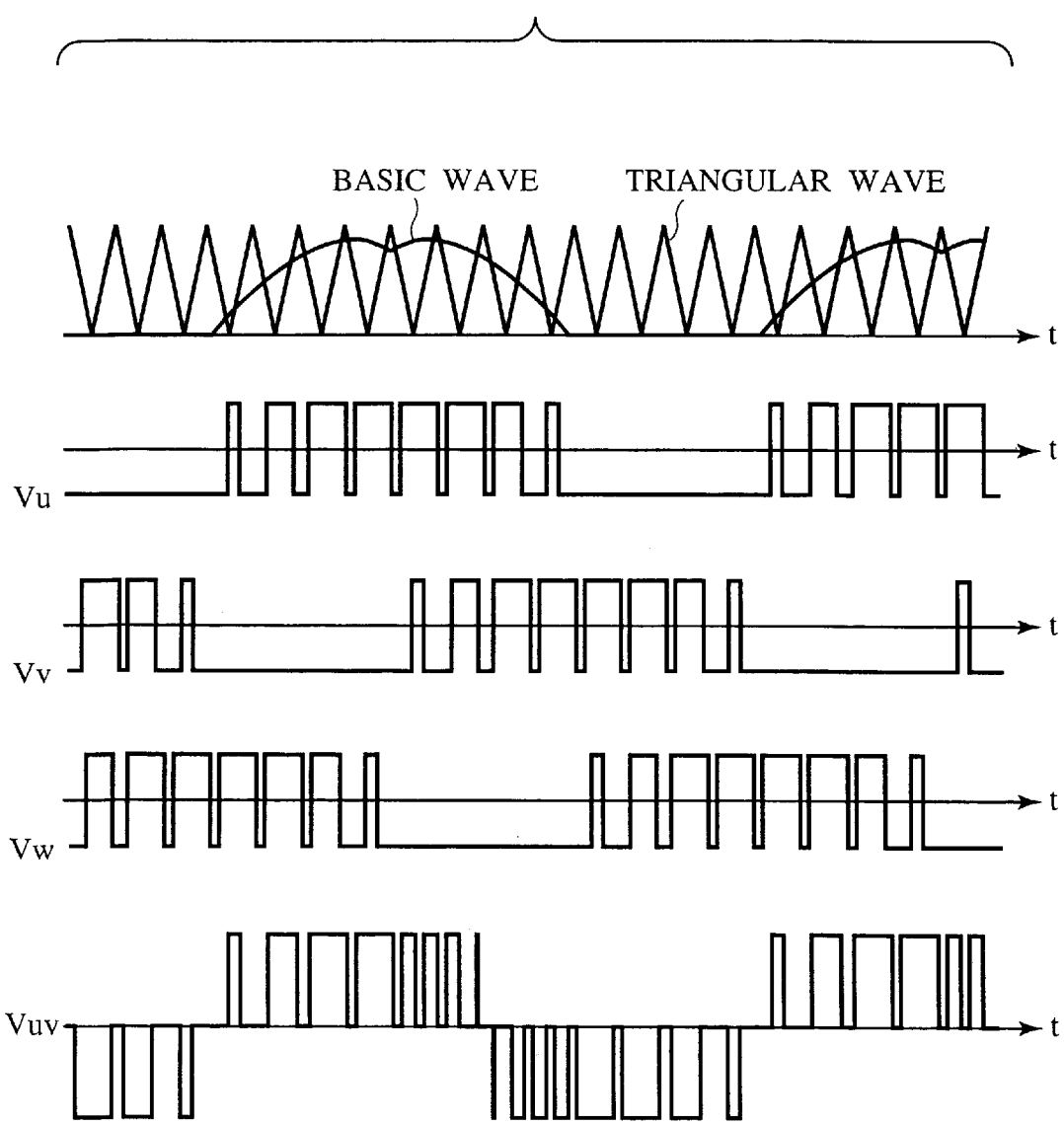
FIG. 3 shows waveforms related to the drive circuit of FIG. 2.

FIG. 3 shows waveforms in the drive circuit 100. This figure shows an example of two-phase modulation, and the frequency of a triangular wave is reduced below an actual one, for the sake of clarity.

The timing circuit 14 provides select signals to turn on and off the switches of the switch circuit 13 in response to the standard clock signal from the clock generator 11. The turned-on switches, i.e., conductive switches in the switch circuit 13 transfer corresponding voltages from the resistor circuit 12 to the comparators 16. Namely, the comparators 16 receive each a basic wave shown in FIG. 3 at the respective phase timing, as well as the triangular wave sown in FIG. 3.

The comparators 16 carry out each a PWM operation according to the basic wave from the switch circuit 13 and the triangular wave from the triangular wave generator 15. According to the outputs of the comparators 16, the output circuit (not shown) provides motor terminal voltages Vu, Vv, and Vw at the timing of respective phases. The voltages Vu, Vv, and Vw form line-to-line voltages Vuv, Vvw, and Vwu (only Vuv is shown in FIG. 3) for the motor. These line-to-line voltages provide sine-wave currents to drive the motor 17.

In this way, the motor drive circuit of the present invention employs the resistor circuit 12 to generate a plurality of voltages among which required ones are selected-by-the timing circuit 14 to form basic waves to generate sine-wave currents. Compared with the prior art that reads data out o a ROM and converts the read data into voltages through DACs, the present invention realizes a compact drive circuit. The drive circuit of the present invention, therefore, can be integrated into a specific IC without a cost increase.

The present invention properly sets the resistance values of the resistors in the resistor circuit 12 to provide target basic waves that correctly generate required sine-wave currents. The present invention needs no precision DACs that are essential for the prior art, and generates correct sine-wave currents without increasing the size and cost of the drive circuit.

Figure 4:
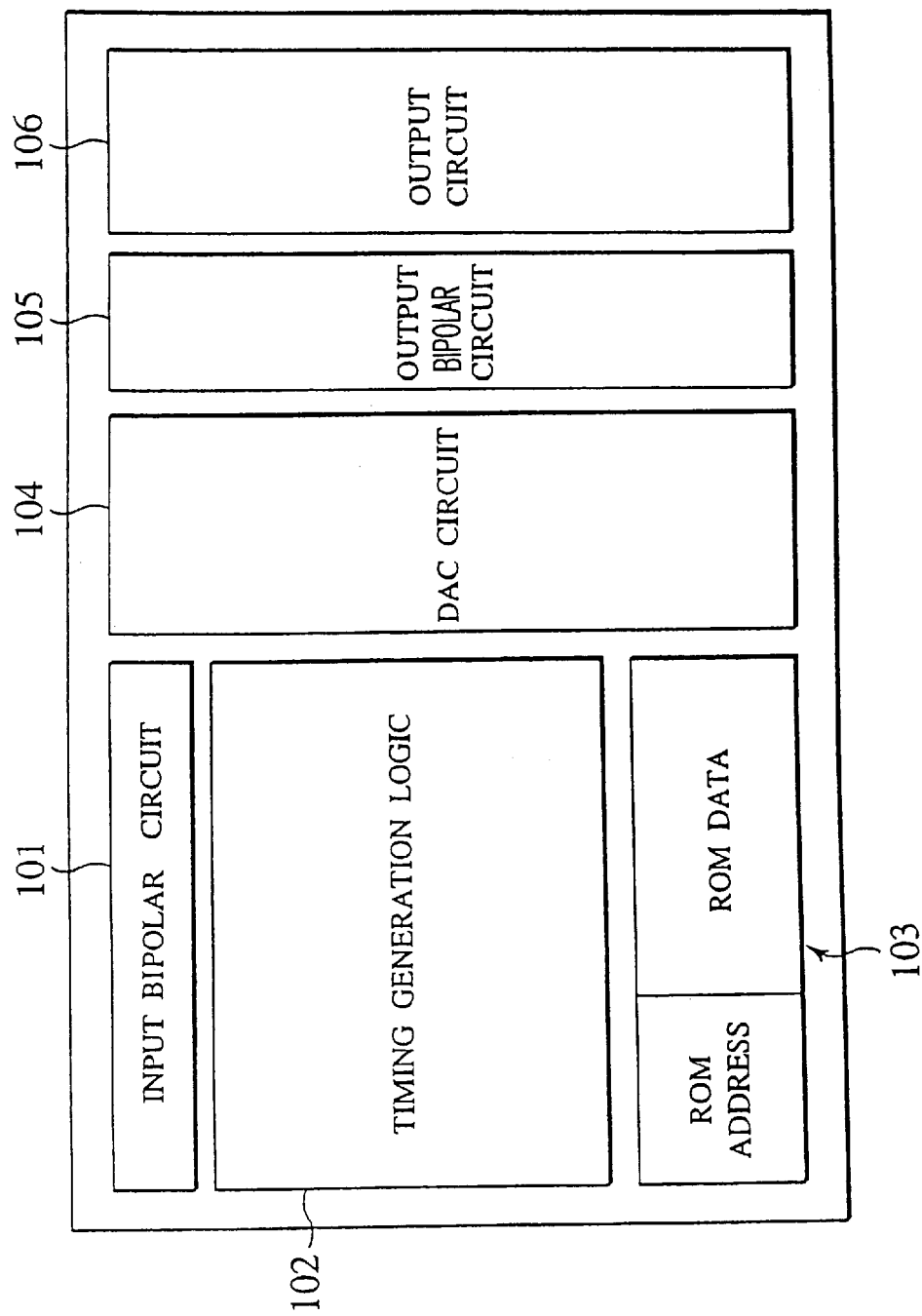
FIG. 4 is a block diagram showing the drive circuit of the prior art.

The difference between the sizes of the drive circuits of the present invention and prior art will be explained. FIG. 4 is a block diagram showing the drive circuit of the prior art. The area ratios of elements in FIG. 4 substantially correspond to those in an actual IC chip. In FIG. 4 an input bipolar circuit 101 includes the standard clock generator 1 of FIG. 1 and a signal input circuit (not shown) containing Hall elements, etc. A timing generation logic 102 includes the timing circuit 2 of FIG. 1. A DAC circuit 104 includes the latches 4 and DACs 5 of FIG. 1. An output bipolar circuit 105 includes the PWM generation comparator 7 of FIG. 1. An output circuit 106 includes the output circuit (not shown in FIG. 1) for driving a motor.

The prior art of FIG. 4 must have a ROM 103 and the DAC circuit 104 to generate basic waves for preparing sine-wave currents. To handle data and addresses in the ROM 103, the timing generation logic 102 must be large.

Figure 5:
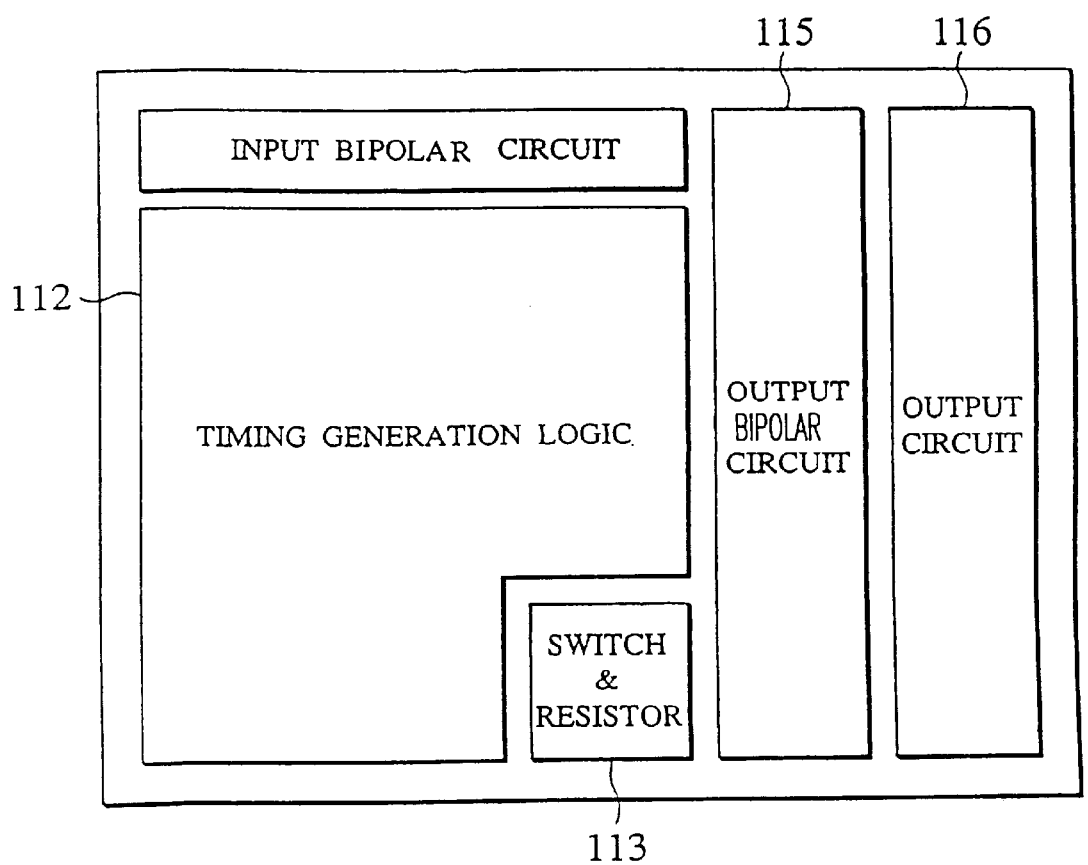
FIG. 5 is a block diagram showing the drive circuit of the present invention.

FIG. 5 is a block diagram showing the drive circuit of the present invention. A timing generation logic 112 includes the timing circuit 14 of FIG. 2. The drive circuit of FIG. 5 is capable of producing basic waves for preparing sine-wave currents with a small switch-register circuit 113 without the large ROM 103 and DAC circuit 104 of FIG. 4. The timing generation logic 112 is small because it handles no addresses or data of the ROM 103. Accordingly, the size of the drive circuit of FIG. 5 is smaller than that of the prior art of FIG. 4.

As explained above, the drive circuit of the present invention employs resistors to generate a plurality of voltages and selects them to form basic waves for preparing sine-wave currents. The drive circuit of the present invention needs no ROMs or DACs, and therefore, involves no cost increase when integrated into a specific IC. The present invention simply calculates and sets the resistance values of resistors in the drive circuit according to the target basic waves, to generate correct sine-wave currents.

The drive circuit of the present invention is compact and low-cost to generate precision sine-wave currents and can be integrated into a specific IC without a cost increase.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A drive circuit comprising:
    a voltage generator configured to form a basic wave for generating sine-wave currents, including,
    a resistor circuit for generating a plurality of voltages,
    a timing circuit for sequentially selecting selected ones of the plurality of voltages generated by the resistor circuit, and
    a switch circuit, connected to the resistor circuit and under control of the timing circuit, for outputting the sequentially selected ones of the plurality of voltages as the basic wave;
    a triangular wave generator for generating a triangular wave; and
    a modulation circuit, which receives as inputs the basic wave outputted by the voltage generator and the triangular wave, for generating a terminal voltage for generating a sine-wave current.

2. A drive circuit as claimed in claim 1, wherein the resistor circuit has a plurality of resistors connected in series.

3. A drive circuit as claimed in claim 2, wherein the resistor circuit has:
    a plurality of nodes among the resistors to output voltages; and
    a plurality of output lines connected to the nodes.

4. A drive circuit as claimed in claim 2, wherein the resistance values of the resistors are set to provide basic waves.

5. A drive circuit as claimed in claim 2, wherein the resistance values of the resistors are set to provide basic waves necessary for generating required sine-wave currents.

6. A drive circuit as claimed in claim 5, wherein the resistance values of the resistors are calculated according to target basic waves.

7. A drive circuit as claimed in claim 1, wherein the switch circuit has switches to be closed and opened in response to signals from the timing circuit.

8. A drive circuit as claimed in claim 7, wherein the switches are separately connected to the output lines of the resistor circuit.

9. A drive circuit as claimed in claim 8, wherein the switches are allocated for three phases.

10. A drive circuit as claimed in claim 9, wherein the three phases are U-phase, V-phase, and W-phase.

11. A drive circuit as claimed in claim 10, wherein different voltages are selectively supplied to the three phases.

12. A drive circuit as claimed in claim 1, wherein a plurality of modulation circuits are allocated for three phases.

13. A drive circuit as claimed in claim 12, wherein the three phases are U-phase, V-phase, and W-phase.

14. A drive circuit as claimed in claim 13, wherein different voltages are selectively supplied to the three phases.

15. A drive circuit as claimed in claim 1, wherein the timing circuit is connected to a standard clock generator.

16. A drive circuit as claimed in claim 12, wherein the timing circuit provides select signals to open and close the switch circuit.

17. A drive circuit as claimed in claim 1, further comprising:
   an output circuit for generating a sine-wave current based on the terminal voltage.

18. A drive circuit as claimed in claim 17, wherein the sine-wave current is used for driving a motor.

* * * * *